May 29, 1945.    J. D. MORGAN ET AL    2,377,027
ELECTRIC HEATERS FOR HEAVY AIRCRAFT
Filed Dec. 30, 1942
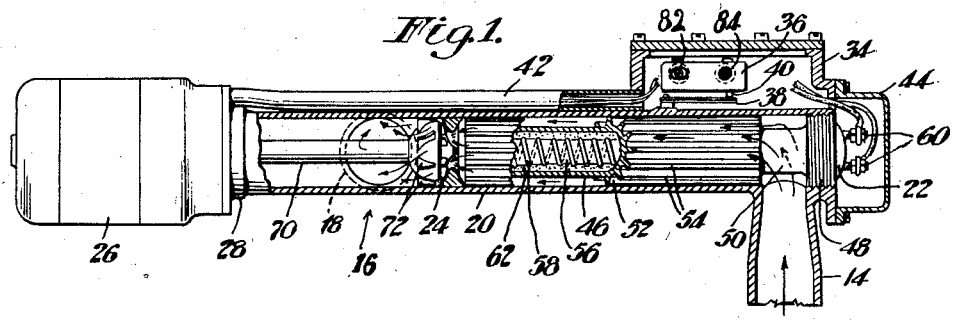
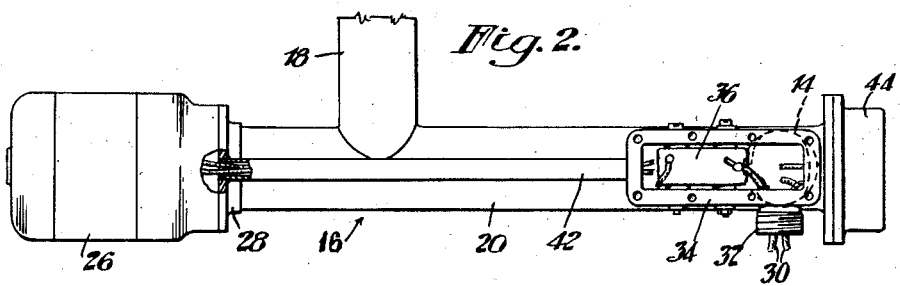
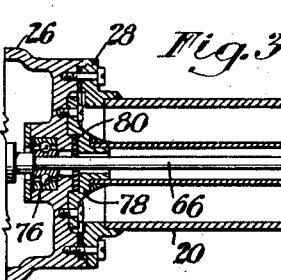
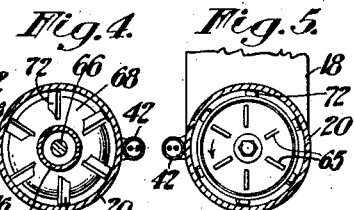
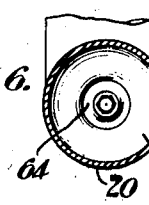
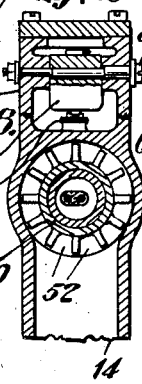
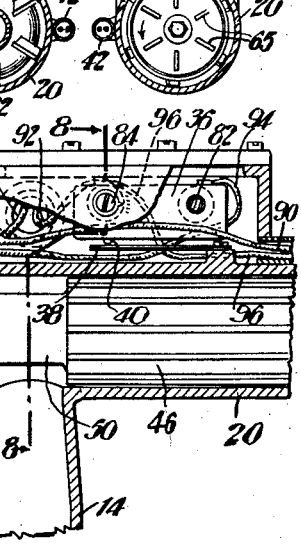
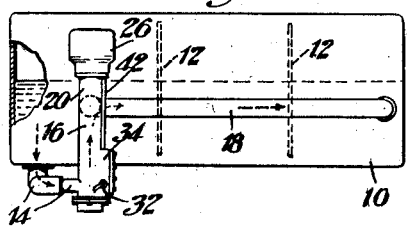
INVENTORS
JOHN D. MORGAN
PERCY B. LEVITT
BY *Edmund G. Borden*
ATTORNEY

UNITED STATES PATENT OFFICE 2,377,027

ELECTRIC HEATER FOR HEAVY AIRCRAFT

John D. Morgan, South Orange, and Percy B. Levitt, Millburn, N. J., assignors to Cities Service Oil Company, New York, N. Y., a corporation of Pennsylvania Application December 30, 1942, Serial No. 470,538

9 Claims. (Cl. 219—39)

This invention relates to improvements in electric heaters for heavy aircraft and more particularly to improvements in motor oil heaters for such aircraft.

Electric heaters have been provided for heating the motor oil of ordinary aircraft in which the heater is mounted directly in the motor oil tank. However, this has been found impracticable with aircraft of the size of the American clippers which are provided with motor oil tanks holding seventy-five gallons or more. The installation of electric heaters directly in such large tanks have been found to be impracticable for the further reason that the tanks are baffled to avoid the pitch and roll of the oil.

These difficulties have been avoided in accordance with the features of the present invention by providing an electric heater mounted outside of the motor oil tank in association with means for drawing the oil from the bottom of the tank, means for conducting it in contact with the heater, and then passing it to the opposite end of the tank. The invention includes other details in arrangement of the various elements of the apparatus and in the features of the construction.

The features and advantages of the electric heating apparatus of the present invention will be apparent to those skilled in the art from the following detailed description taken in connection with the accompanying drawing which forms part of this application. In the drawing:

Fig. 1 is a longitudinal view partly in broken section of the heater assembly constructed in accordance with the present invention.

Fig. 2 is a view looking down on the apparatus shown in Fig. 1 with certain parts removed or broken away.

Fig. 3 is an enlarged detailed sectional view similar to that of Fig. 2 showing the details of construction of a portion of the apparatus shown in Figs. 1 and 2.

Fig. 4 is a cross-sectional view taken on the line 4—4 of Fig. 3, looking from the left.

Fig. 5 is a cross-sectional view taken on the line 5—5 of Fig. 3, looking from the right.

Fig. 6 is a cross-sectional view taken on the line 6—6 of Fig. 3, looking from the right.

Fig. 7 is an enlarged vertical broken sectional view similar to that of Fig. 1 but from the opposite side showing the details of construction and arrangement of a portion of the apparatus.

Fig. 8 is a vertical sectional view taken on the broken line 8—8 of Fig. 7, looking from the left.

Fig. 9 is a diagrammatic view showing the assembled apparatus in connection with a large oil tank on a heavy aeroplane.

Referring to Fig. 9 of the drawing, the general assembly of apparatus in accordance with the present invention includes an oil tank 10 of a heavy aeroplane adapted to hold seventy-five gallons or more of motor oil. The connections of the tank with the aeroplane motor and for filling and draining, are not shown. Such tanks are sometimes mounted in inclined position. The tank 10 is provided with a plurality of baffles 12 to prevent rolling and pitching of the oil. The oil to be heated is withdrawn from the bottom of the tank at one end through a pipe 14 conducted through the electric heating apparatus of the present invention, shown generally at 16, and then passed through a pipe 18 into the opposite end of the tank 10 at a point substantially above the bottom of the tank. The heating apparatus 16 is preferably built of light metals such as aluminum, magnesium and their alloys, and is preferably mounted in approximately the position shown with respect to the tank 10 by means of the pipe connections 14 and 18. However, the heating apparatus 16, which includes an electric motor, may be held in a more rigid position with respect to the tank by means of suitable mounting brackets, not shown, which may be used to mount the apparatus on a part of the fuselage.

The arrangement of the electric heater, pump, electric motor, and temperature control means is shown in Figs. 1 and 2, while the essential details of construction are shown in Figs. 3 to 8. The apparatus in Figs. 1 and 2 includes a long tubular cylindrical shell 20 which houses an electric heater 22 at the inlet end and a turbine pump 24 between the end of the heater 22 and the oil outlet 18. The pump is driven by an electric motor mounted in a water-tight explosion-proof motor housing 26 attached in alignment to a flange 28 on the left end of the shell 20.

Electric current for the heater 22 and motor is supplied from the aeroplane batteries or generator or both, or from an outside source of electricity through lead wires 30 (Fig. 2) which terminate in a plug 32 on the side of a switch box 34. This switch box is mounted directly on the shell 20 in a fluid-tight manner so that the shell constitutes the bottom of the box. A microswitch 36 is mounted inside the box directly over a bimetallic strip 38, one end of which is fastened in a fixed position to the shell 20 so that the opposite free end is directly under a switch pin 40. The switch box 34 is connected with the motor housing 26 by means of a metal conduit 42 for the electric lead wires for the motor. One end of the conduit 42 is mounted directly in the flange 28. A passage for the electric lead wires for the heater is also provided from the switch box 34 to a chamber in a flanged head member 44 which covers the head of the heater 22.

The electric heater 22 comprises a one-piece metal casing 46 having a threaded end section 48 for securing the heater in the shell 20 in the manner shown, a relatively narrow neck section 50 directly over the oil inlet pipe 14, and a relatively long heating section composed of long narrow deep open-ended channels 52 extending from the inlet 14 to the other end of the heater. It will be noted that the series of channels extend entirely around the casing 46, and that the channels are separated by relatively thin parallel metal walls 54 which are integral with the body of the casing 46. The casing 46 including the metal walls 54 preferably has a diameter about 1/2-inch smaller than that of the shell 20, and is preferably mounted so that the walls 54 do not touch the shell 20. There is therefore a tendency for a thin layer of relatively cool oil to stay on the inside of the shell 20, while the heated oil flows through the channels 52.

The tubular casing 46 is provided with an electric heating unit including a hollow cylindrical zircon core 56 and a resistance wire 58 wrapped therearound in spaced convolutions through the length of the channeled section of the heater. The terminals of the resistance wire 58 are attached respectively to studs 60 mounted in a plastic insulation comprising the head of the heater 22. The resistance wire 58 may be chromium, nickel chromium alloy, or aluminum-cobalt-iron alloy.

In making up the heater 22 after the outside machining is completed, the resistance wire 58 and the core 56 are coated with a zircon wash made of 50% of milled grain zircon and 50% of natural grain zircon bonded with a mixture of 6% $P_2O_5$ and 2% chromic acid. This coating is hardened on the wire and the core by heating this assembly to a temperature of about 600° F. in an oven. The core and resistance wire assembly is mounted in the metal casing 46 in spaced relation to the metal wall, the space being filled with fine zircon sand 62 which is a good dielectric and at the same time has a high heat conductivity. This layer of sand completely surrounds the core and resistance wire and may be very densely packed by vibrating the casing as the sand is introduced. The packed-in sand is held in place by the plastic insulation head or other suitable means.

The turbine pump 24 is shown more in detail in Figs. 3 to 6 and comprises an impeller 64, provided with vanes 65, mounted on the end of a relatively long shaft 66 in a chamber formed between the oil outlet 18 and the end of the heater 22. The inlet of the chamber comprises the central opening in a specially shaped annular member 67, the outer circumference of which fits the inside of the shell 20 and is attached thereto closely adjacent the end of the heater 22. The back of the pump chamber, or housing for the impeller 64, comprises an annular cup-shaped member 68 fitted on the end of a tubular housing 70 for the shaft 66. The member 68 is slightly smaller in diameter than the inside diameter of the shell 20 and is uniformly spaced therefrom by means of fixed vanes and spacers 72, which may be integral with the member 68, or soldered or otherwise fastened to the member 68.

The impeller shaft 66 which is connected to the electric motor in the housing 26, is mounted in a bearing 74 in the right end of the tubular housing 70 and in a ball-bearing 76 mounted in the motor housing 26, the housing 70 being firmly attached to the motor housing 26 by a flanged member 78 with an intervening packing 80 for the shaft 66. Small amounts of oil may flow through the bearing 74 along the shaft 66 when the pump is not running, but the packing 80 will prevent the entry of any oil into the motor housing. A gasket is also used between the flange 28 and the motor housing 26 to prevent leakage of oil from the space around the shaft housing 70 inside the shell 20. The turbine pump 24 picks up the heated oil as soon as it leaves the heater 22 and throws it around the cup-shaped member 68 into the space to the left of the pump and forces the heated oil out through the line 18 by which it is conducted back into the tank 10. The arrangement of the heater and pump is such that the pump impeller is practically always operating in the highest temperature oil in the system when the heater is on, and keeps up the circulation through the apparatus until oil in the tank reaches the desired temperature.

The detailed arrangement of the electric wiring and temperature control mechanism for the heater and pump motor is shown in detail in Figs. 7 and 8 in which the microswitch 36 is shown as being mounted between positioning side bearings in the switch box 34 by means of a fixed cross-bolt 82 and an eccentric screw-bolt 84, the latter of which is provided with an outside indicator as shown in Fig. 7. The switch 36 is provided with a slotted hole (Fig. 1) for the bolt 82 so that longitudinal movement may be obtained when the bolt 84 is turned. The bolt 84 is positioned directly over the switch pin 40, and is adapted when rotated to raise or lower the left end of the switch 36 (Fig. 7) with respect to the free end of the bimetallic strip 38, as shown by the structure of the eccentric bolt 84 in Fig. 8.

The bimetallic strip 38 is mounted directly on the casing 20 so that the heat of the oil at the point of mounting is transmitted directly to the bimetallic strip. When the oil becomes sufficiently hot in the tank the free end of the strip moves up, engages the pin 40 and eventually forces the pin up and throws the switch to cut off the supply of current to the electric heater. The motor and pump is kept running continuously to keep the temperature uniform in the tank.

In accordance with the wiring arrangement shown in Fig. 7, a lead wire 88 runs directly from the plug 32 to one of the studs 60 while a branch wire 90 leads from the wire 88 through the housing 34 and conduit 42 to the electric motor. A second wire 92 from the plug 32 leads to an attachment on the switch 36 while a wire 94 leads from a second attachment on the switch 36 to the second stud 60. A wire 96 is connected to the wire 92 or its switch attachment and leads through the conduit 42 to the electric motor, so that the motor is connected in as soon as the plug 32 is connected to a current supply. From the foregoing description and arrangement of the wiring, it will be apparent that the electric motor and heater are arranged so that the motor runs continuously while the heater is started and stopped in accordance with the functioning of the bimetallic strip 38 which in turn acts in response to the temperature of the oil soon after it enters the shell 20. Current is usually supplied from an outside source through wires 30, as for example when the plane is at its base. The pump keeps the oil temperature uniform while the heater gives the desired temperature.

While the shell 20 has been shown and described as cylindrical and the shape of the other elements mounted therein described as of the same cross-section, it is to be understood that a different cross-section may be used such as rectangular, elliptical, etc. Furthermore, while the turbine pump shown and described is the preferred form and particularly adapted for the purpose, it is to be understood that a pump of other structure may be employed for circulating the oil from the oil tank through the heater and back into and through the tank. Various other modifications may be made in the details of construction and arrangement without departing from the spirit and scope of the invention.

In the handling of the aeroplane motor oil in accordance with the present invention, the indicator on the screw-bolt 84 is preferably set so that the switch pin 40 is thrown to cut off the current at the temperature desired for the oil in tank 10. In some cases, this temperature may be relatively low such as zero degrees or 10° F., especially where aircraft is not operated under emergency conditions. A setting of the indicator to maintain this temperature will prevent freezing of the motor oil and will keep it sufficiently fluid for ordinary use. However, under emergency conditions, it may be desirable to maintain the oil in the tank 10 at a relatively high temperature of from 100° to 200° F., so that the aircraft can take off on a few minutes notice without waiting for the usual rather long period for warming up the motors. A temperature of 150° F. may be suitable for a quick take-off, but if the motors are cold, it may be advisable to heat the oil in the tank 10 (and other tanks) to a temperature as high as 250° F. and maintain it at that temperature during an emergency so that once the motors are started the extra heat in the oil will aid in warming up the motors quickly. (In most cases there is a separate tank for each other.)

Regardless of the temperature at which the oil is maintained in the tank 10, the tank is preferably insulated against heat loss as are also the lines 14, 18 and the shell 16, including the switch box 34. The film of oil on the wall of the shell 10 is of some help in preventing loss of heat. The scale opposite the indicator bolt 84 may be calibrated so that it will be possible to tell at a glance the temperature for which the indicator is set. While in accordance with the preferred form of the invention the apparatus has been described in connection with the motor oil tanks of aircraft, it is to be understood that the apparatus may be advantageously used on internal combustion engines of various kinds for keeping the crank case oil at the desired working temperature or for keeping cooling water or other cooling fluid at a working or other predetermined temperature, such as for example to prevent freezing.

Having described the invention in its preferred form, what is claimed as new is:

1. An apparatus for heating the motor oil of a heavy aircraft, comprising a tank for the oil, an oil outlet pipe leading from the lower portion of the tank and connected into the side of a relatively long vertically mounted tubular shell near one end thereof, said shell containing an electric heater and a turbine pump, an oil return pipe leading from the opposite end of said shell and connected into the tank at a point remote from said oil outlet pipe, said heater being mounted in said shell near the oil inlet thereto and adapted to heat the oil to a predetermined temperature, said pump being mounted in said shell between said electric heater and the inlet to said return pipe and adapted to draw oil from said tank through said heater and force the resulting heated oil back into said tank through said return pipe, an electric motor mounted on top of said shell and connected for operating said pump, means for supplying electric current to said motor and heater from a common source, a switch in the current line to the heater, and control means responsive to changes in the temperature of the oil in the apparatus connected to said switch in such a way as to cut off electric current to said heater when the oil reaches a predetermined temperature without cutting off the electric current to said motor.

2. In an apparatus for electrically heating motor crank case oils and for keeping such oils at the desired working temperature including a container for the motor oil and an electric heater for heating the oil, an oil outlet pipe leading from the lower portion of the container and connected into the side of a relatively long tubular shell near one end thereof, said shell containing said electric heater and a pump, an oil return pipe leading from the opposite end of said shell and connected into said container at a point remote from said oil outlet pipe, said heater being mounted in said shell near the oil inlet thereto, said pump being mounted in said shell between said electric heater and the inlet to said return pipe and adapted to draw oil from said container over said heater and force the resulting heated oil back into said container through said return pipe, an electric motor for driving said pump, a common source of electricity for said motor and said electric heater, and control means resposive to changes in the temperature of the oil in said shell near the oil inlet connected to cut off the electricity to said heater when the oil reaches a predetermined temperature without cutting off the electricity to said electric motor.

3. In an apparatus for electrically heating motor crank case oils and for keeping such oils at the desired working temperature including a container for the motor oil and an electric heater for heating the oil, a pipe leading from the lower portion of the container and connected into the side of a relatively long tubular metal shell near one end thereof, said shell containing the electric heater, an oil return pipe leading from the opposite end of said shell and connected into said container at a point remote from the inlet of said first-mentioned pipe, said heater being mounted in said shell near the oil inlet and adapted to heat the oil to the desired working temperature, a pump mounted in said shell between said electric heater and the inlet to said return pipe, said pump being adapted to draw oil from said container over said heater and force the resulting heated oil through said return pipe into said container, means including a switch for supplying electric current to said heater, and control means responsive to changes in the temperature of the oil in said shell near the oil inlet connected in such a way as to operate said switch and cut off the electricity to said heater when the oil in the container reaches said working temperature.

4. In an apparatus for electrically heating motor crank case oils and for keeping such oils at the desired working temperature including a container for the motor oil and an electric heater for heating the oil, a pipe leading from the lower portion of the container and connected into the side of a relatively long vertically mounted shell near one end thereof, said shell containing the electric heater, an oil return pipe leading from the opposite end of said shell and connected into said container at a point remote from said first-mentioned pipe, said heater being mounted in said shell in spaced relation therefrom near the oil inlet and adapted to heat the oil to the desired working temperature, a pump mounted in said apparatus adapted to circulate oil from said container through said heater and through said return pipe back to said container; an electric motor for driving said pump, a common source of electricity for said motor and heater, and means responsive to changes in the temperature of the oil in said shell near the oil inlet connected in such a way as to cut off the electricity to said heater when the oil in the container reaches said working temperature without cutting off the electricity to said motor.

5. An apparatus as defined by claim 4 in which said heater includes a casing containing exterior longitudinal oil-heating channels.

6. In an apparatus for electrically heating motor crank case oils and for keeping such oils at the desired working temperature including a container for the motor oil and an electric heater for heating the oil, a pipe leading from the lower portion of the container and connected into the side of a relatively long vertically mounted shell near one end thereof, said shell containing the electric heater, an oil return pipe leading from the opposite end of said shell and connected into said container at a point remote from said first-mentioned pipe, said heater being mounted in said shell near the oil inlet and adapted to heat the oil to the desired working temperature, a turbine pump mounted in said shell between said electric heater and the inlet to said return pipe, said pump being driven by an electric motor and adapted to draw oil from said container over said heater and force the resulting heated oil through said return pipe into said container, a common source of electricty for said motor and heater, and means responsive to changes in the temperature of the oil in said shell near the oil inlet connected in such a way as to cut off the electricity to said heater when the oil in the container reaches said working temperature without cutting off the electricity to said motor.

7. An apparatus as defined by claim 6 in which said heater comprises a casing having an endless series of longitudinal oil-heating passages and is spaced slightly from said shell.

8. An apparatus for heating the motor oil of a heavy aircraft, comprising a tank for the oil, an oil outlet pipe leading from the lower portion of the tank and connected into the side of a relatively long tubular metal shell near one end thereof, said shell containing an electric heater and a pump, an oil return pipe leading from the opposite end of said shell and connected into the tank at a point remote from said oil outlet pipe, said heater being mounted in said shell near the oil inlet thereto and adapted to heat the oil to a predetermined temperature, said pump being mounted in said shell between said electric heater and the inlet to said return pipe and adapted to draw oil from said tank through said heater and force the resulting heated oil back into said tank through said return pipe, an electric motor mounted at the pump end of said shell and connected for operating said pump, means for supplying electric current to said motor and heater from a common source, a switch in the current line to the heater, and control means responsive to changes in the temperature of the oil in the apparatus including a bimetallic strip fixed to said metal shell to receive heat therefrom and mounted in operative relation to said switch and arranged to cut off electric current to said heater when the oil reaches a predetermined temperature without cutting off the electric current to said motor.

9. An apparatus as defined by claim 8 in which said switch is mounted in a switch box adjacent said strip, a switch pin to be operated by the free end of said strip, and means for varying the distance between said pin and the free end of said strip.

JOHN D. MORGAN.
PERCY B. LEVITT.